(12) United States Patent
Daniel et al.

(10) Patent No.: US 9,438,539 B1
(45) Date of Patent: Sep. 6, 2016

(54) APPARATUS AND METHOD FOR OPTIMIZING THE NUMBER OF ACCESSES TO PAGE-REFERENCE COUNT STORAGE IN PAGE LINK LIST BASED SWITCHES

(71) Applicant: Xpliant, Inc., San Jose, CA (US)

(72) Inventors: Tsahi Daniel, Palo Alto, CA (US); Enric Musoll, San Jose, CA (US); Sridevi Polasanapalli, San Jose, CA (US)

(73) Assignee: Xpliant, Inc., San Jose, CA (US)

(*) Notice: Subject to any disclaimer, the term of this patent is extended or adjusted under 35 U.S.C. 154(b) by 67 days.

(21) Appl. No.: 14/142,631

(22) Filed: Dec. 27, 2013

Related U.S. Application Data

(60) Provisional application No. 61/873,289, filed on Sep. 3, 2013.

(51) Int. Cl.
*H04L 12/28* (2006.01)
*H04L 12/883* (2013.01)
*H04L 29/06* (2006.01)

(52) U.S. Cl.
CPC ........ *H04L 49/9015* (2013.01); *H04L 69/22* (2013.01)

(58) Field of Classification Search
CPC ...................................................... H04L 65/60
USPC ............................................................ 370/412
See application file for complete search history.

(56) References Cited

U.S. PATENT DOCUMENTS

| 8,432,908 | B2* | 4/2013 | Li et al. ............... 370/390 |
| 2007/0014231 | A1* | 1/2007 | Sivakumar et al. ...... 370/216 |
| 2013/0091237 | A1* | 4/2013 | Arulambalam et al. .... 709/213 |

* cited by examiner

*Primary Examiner* — Wei Zhao
(74) *Attorney, Agent, or Firm* — Cooley LLP

(57) ABSTRACT

A packet processor includes a packet memory manager configured to receive a single header reference count and a single payload reference count for a packet. A page link list walk for the header under the control of the header reference count is performed in parallel with a page link list walk for the payload under the control of the payload reference count.

7 Claims, 8 Drawing Sheets

APPARATUS AND METHOD FOR OPTIMIZING THE NUMBER OF ACCESSES TO PAGE-REFERENCE COUNT STORAGE IN PAGE LINK LIST BASED SWITCHES

CROSS-REFERENCE TO RELATED APPLICATION

This application claims priority to U.S. Provisional Patent Application Ser. No. 61/873,289, filed Sep. 3, 2013, the contents of which are incorporated herein by reference.

BACKGROUND

A packet-processing device usually needs to buffer the packets into a packet memory or PM while the device processes them. The size of some packets (for example Ethernet packets) is not known in advance, so the device needs to start storing the packet into the packet buffer without knowing how large the packet is. Moreover, packets arrive at the device in an interleaved fashion, so the device is simultaneously storing several incoming packets into the packet buffer.

The state of the art solution to store the packet in the device's memory is to assign multiple chunks (called pages) of packet memory to each packet, rather than a single big chunk. With this scheme, the packet is not stored consecutively in the packet memory, rather the pages of the packet are scattered throughout the packet memory. Therefore, a memory manager or buffer manager (BM) needs to maintain a linked list of all the pages that a particular packet uses in the packet memory. This linked list is traversed when the packet is read out of the packet memory for transmission. Each page has associated state that contains some information about the page, mainly:
  A pointer to the next page;
  Whether the page contains the start of packet (SOP) and/or the end of packet (EOP) attribute of the packet, the end of header (EOH), and possibly other attributes;
  The valid bytes stored in the page (usually only relevant for the last page, where not all the page contains valid data)
  . . .

The state of all the pages in the packet processor device is maintained by the memory manager. A packet has an associated descriptor that in its basic form is the pointer to the first page. With this initial pointer, all the pages used by the packet can be retrieved in the same order they were used by traversing the link list built from the next page pointers in the different page states. The memory manager is also responsible for providing the available pages (free pages) to the engines that receive the packet data and store this data into the packet memory, and eventually reclaim the used pages once the packets using those pages have been transmitted out.

In packet processing devices such as switches, packets can broadly be classified into two categories: unicast and multicast/broadcast. Unicast packets are packets that are sent to a single egress port while multicast/broadcast packets are sent to several ports. In switches with packet memories implemented with page link lists, the same page can be used by different packets. In the context of this disclosure, this page is said to have a reference count (ref cnt) equal to the number of packets that use the page. Also, pages are classified into header or payload pages, depending on whether a page has been used to store part of or the entire header of the packet, or none, part of or the entire payload of the packet. Note that the entire packet may have been stored in one or more header pages, in which case no payload pages exist. In the context of this disclosure, the header size of a packet is configurable and comprises the initial portion of the packet that is of interest to the packet processing device to perform the processing (modifying the packet and determining the egress port).

FIGS. 1A-1F show examples of page link lists for packets that have dedicated pages or that share pages with other packets. The number 100 inside a page 102 indicates the number of references to that page, i.e. how many packets use that page. In FIG. 1A a unicast packet has header and payload pages. All pages have a single reference count.

In FIG. 1B two packets share the same payload. Therefore, all of the pages of the payload have 2 references. The header of both packets is different in size and/or content. Ph B's header fits in a single page.

In FIG. 1C 10 different packets all have the same content; therefore, all pages have the same reference count of 10. These are different packets that may be sent to the same or different egress ports.

FIG. 1D is a mixture of the examples of FIGS. 1B and 1C. FIG. 1E is a unicast packet with no payload. FIG. 1F corresponds to the example of FIG. 1C, but there is no payload.

In the nomenclature of this disclosure, unicast packets are defined as packets that have not been created by partially or totally using other packets. Thus, FIGS. 1A and 1E illustrate unicast packets. A packet that is received at an ingress port, gets processed (e.g., its header is modified), and is sent to a single egress port is considered a unicast packet. In this disclosure, it is assumed that if the header or the payload is shared, all the pages composing the header or payload are shared and therefore all of them have the same reference count.

In a state of the art packet processing device, incoming packets are stored into the packet memory (PM) by a specialized direct-access memory (DMA) block (henceforth named Receive DMA or RDMA) and outgoing packets are retrieved from the PM by another DMA block (henceforth named Transmit DMA or TDMA).

FIG. 2 depicts the basic interaction between RDMA, PM and BM. In particular, write page clients 200 are RDMA clients that write data to packet memory 202. Read page clients 204 are TDMA clients that read data from packet memory 202.

The Figure also shows another main component of such a device broadly labeled as the Control block 208. The main functions of the Control block are: perform any necessary modification of the header of the packet, store the header of the packet to the PM, decide to which port or ports to send the packet, and perform any traffic management. For the purpose of this disclosure, the Control block provides the packet descriptor to the TDMA, which is then responsible from that point on to read the packet data from packet memory and send it out to the egress port.

The sequence of events for a given packet is the following:
  RDMA or write page client 200 receives the packet data from the ingress port and stores its payload into the PM 202 using the pages that the memory manager or buffer manager BM 206 provides;
  RDMA allocates the pages for the header (alternatively, Control could allocate these pages from the BM 206);

RDMA generates a packet descriptor containing, among other information, the pointer of the first header page. In one embodiment, a packet descriptor corresponds to a single packet;

Control 208 processes the header of the packet and stores it into the PM 202 using the pages that the RDMA allocated;

For each page used, Control 208 sends the proper reference count update to the BM 206 since Control has processed the packet and knows whether the header and/or payload has been replicated and multiple packets now share the same header and/or payload; this is shown in FIG. 2 as "RefCnt Update for All Pages";

Read page clients of the TDMA 204 are ready to send on a particular egress port, so TDMA requests from the Control block a descriptor for a packet to be sent to that egress port;

Control sends the descriptor if it has one;

TDMA 204 reads the page states from the BM 206 and, for each page state, performs one or more requests to the PM 202 to obtain the packet data;

TDMA 204 sends the packet data to the egress port;

TDMA 204 sends a notification to the BM 206 that all the pages used by the packet can be potentially reclaimed; and BM 206 performs the reclaiming of pages, which are then allocated to the write clients of the RDMA 200.

Note that in this baseline approach the reference count storage (RefCnt Storage) is accessed every time a page is used by an incoming packet. This access can be a write or a read-modify-write (if the update is an increment/decrement of the previously stored value).

Similarly, when a packet is transmitted, the reference counts for all the pages involved in the packet need to be read from the RefCnt Storage, and if a page's reference count is 0, that page can be reclaimed and reused for another packet. If the reference count is not 0, then the reference count needs to be decremented and written back into the RefCnt Storage.

Therefore, this baseline implementation of the reference counts of the pages in a page link list based packet buffer requires a high access rate to the reference count storage. Since the number of pages is usually large in high performance packet processing devices, the reference count storage can be costly in terms of area (due to the amount of access ports to the storage) and/or power consumption. Consequently, it is desirable to devise techniques to reduce the cost of this approach.

SUMMARY

A packet processor includes a packet memory manager configured to receive a single header reference count and a single payload reference count for a packet. A page link list walk for the header under the control of the header reference count is performed in parallel with a page link list walk for the payload under the control of the payload reference count.

A packet processor has a packet memory manager configured to receive an indicator of reference count invalidity. A header page and a payload page are freed in response to the indication of reference count invalidity without accessing a reference count.

BRIEF DESCRIPTION OF THE DRAWINGS

The invention is more fully appreciated in connection with the following detailed description taken in conjunction with the accompanying drawings, in which.

Like reference numerals refer to corresponding parts throughout the several views of the drawings.

DETAILED DESCRIPTION

Figure 1A:
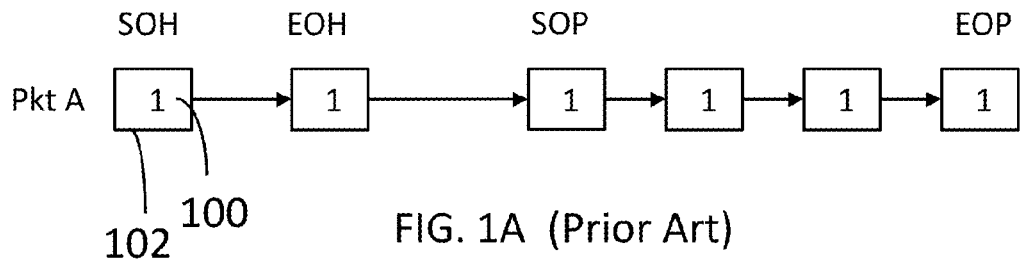
FIGS. 1A-1F are examples of page link lists using dedicated pages or sharing pages with other packets.
Figure 1B:
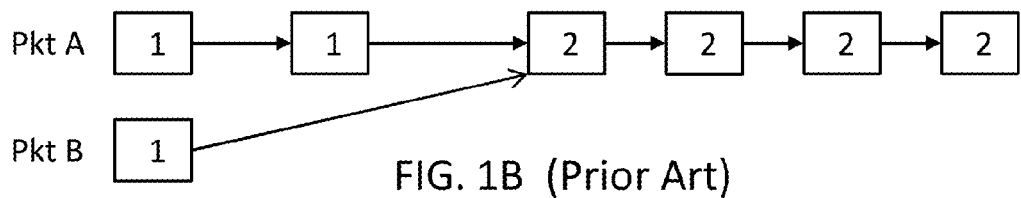
Figure 1C:
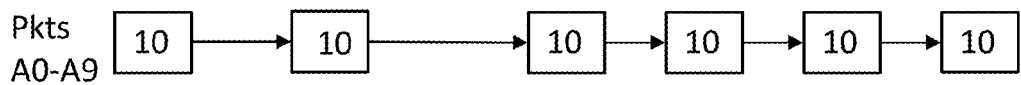
Figure 1D:
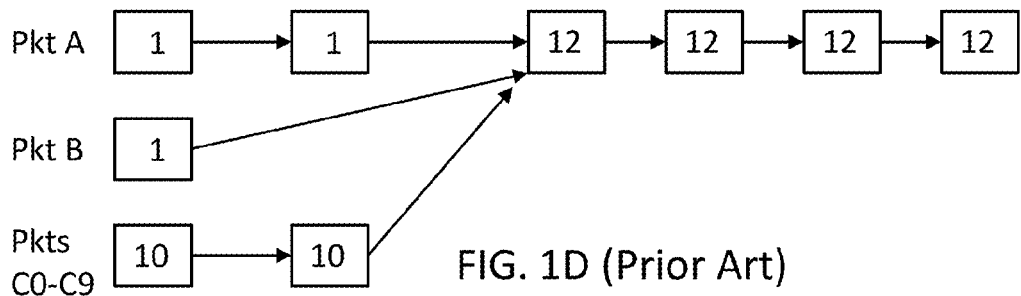
Figure 1E:
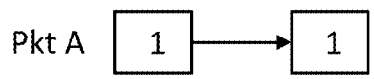
Figure 1F:
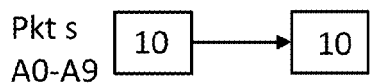
Figure 2:
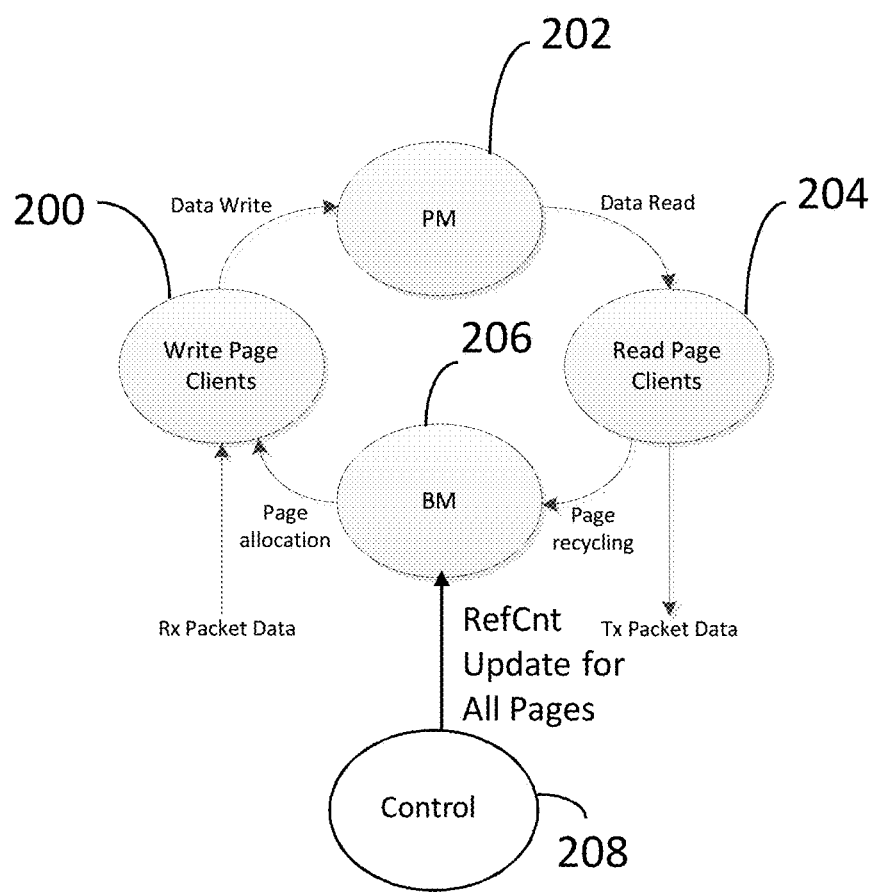
FIG. 2 shows prior art interactions between write page clients, packet memory, read page clients, a buffer manager and a control block, with reference count updates for all pages.
Figure 3:
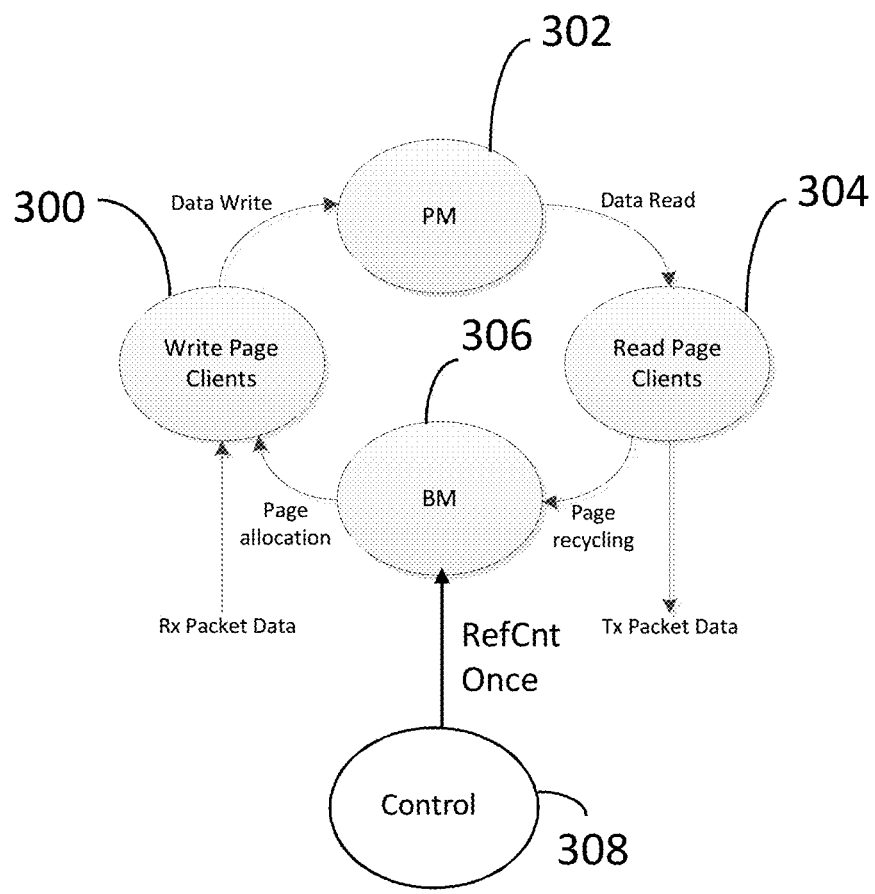
FIG. 3 shows interactions between write page clients, packet memory, read page clients, a buffer manager and a control block, with a single reference count update for all pages.
Figure 4A:
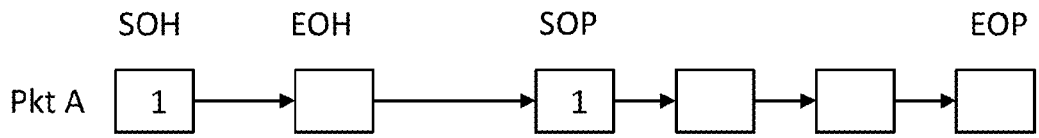
FIGS. 4A-4F show examples of page link lists with only the first header and first payload page (if any) having reference count information.
Figure 4B:
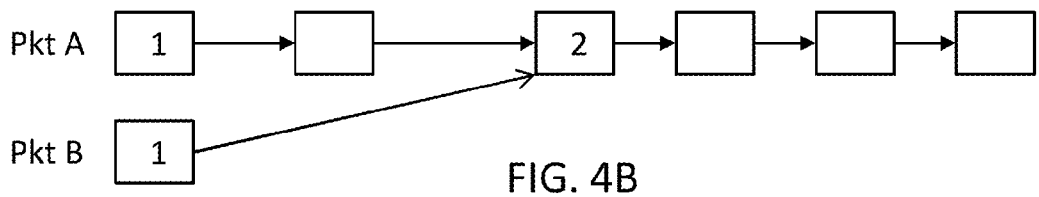
Figure 4C:
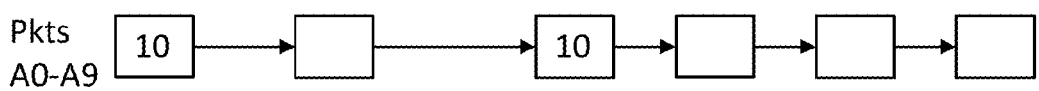
Figure 4D:
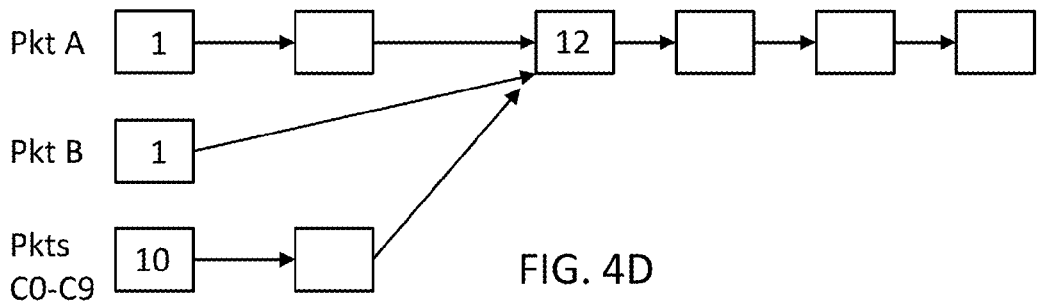
Figure 4E:
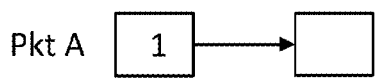
Figure 4F:
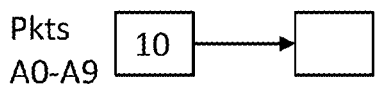

FIG. 3 illustrates processing associated with an embodiment of the invention. In particular, unlike the processing of FIG. 2, where reference count information is obtained for every page, in FIG. 3 the reference count is only obtained once. The first page in each group is used as the representative of that group. In this scenario, the same page link list examples shown in FIGS. 1A-1F are now shown in FIGS. 4A-4F with reference count information only in the first header and first payload pages. In order to avoid updating the reference counts for the non-first header and non-first payload pages, two changes are required in the interaction among the different blocks with respect the baseline implementation:

The packet descriptor now needs to contain the first payload page pointer as well as the existing first header page pointer. It also needs to include whether the payload exists or not.

Control no longer updates all the pages used by the packet, just the first header page and the first payload page (if it exists).

Figure 5:
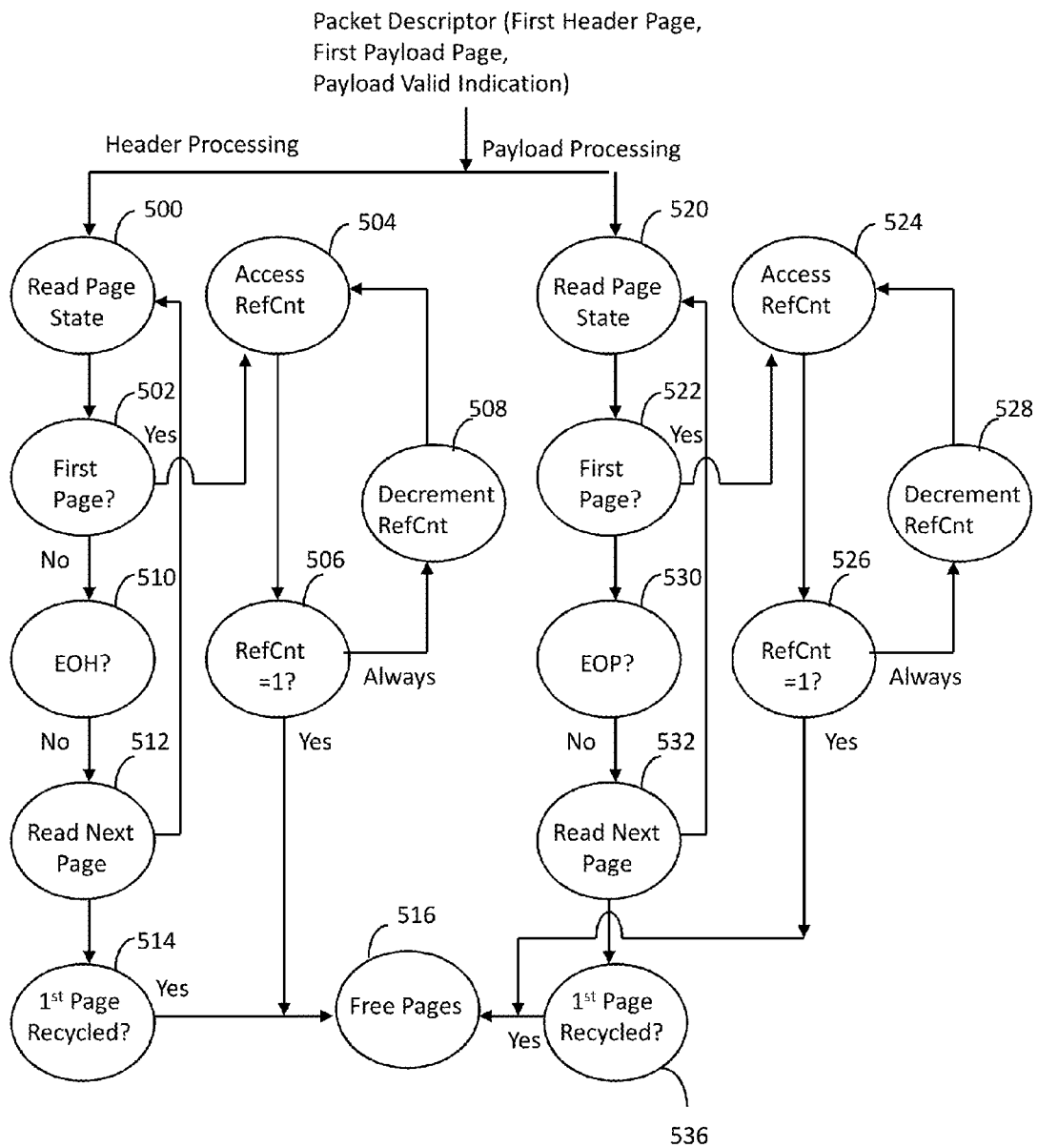
FIG. 5 shows a page reclaiming process in the memory manager in accordance with an embodiment of the invention.

When the TDMA sends the packet descriptor to the BM to reclaim the pages, two independent page link list walks occur: one for the header pages and another for the payload pages (if they exist). This is shown in FIG. 5. In particular, FIG. 5 shows header processing on the left and payload processing on the right. The two page link-list walks can be done in parallel since there are no dependencies between the two link lists; the link-list walk for the payload pages can start at the same time as the link-list walk for the header pages since the first payload page pointer is in the packet descriptor provided by the TDMA. Another benefit of this scheme is that the pages that are not required to access the RefCnt Storage can be sent to the pool of free pages earlier.

Header processing begins at block 500, where the first page state is read. If this is the first page (as indicated in the descriptor), then processing proceeds to a reference count access operation 504, which is the sole reference count access operation. Next, the reference count is compared to the value of 1 in block 506. If the reference count is 1, then the page can be freed, thereby forming a freed page 516. If the reference count is not 1, then it is decremented in block 508.

The state for another page is read at block 500. At this point, the first page test of block 502 will yield a no state and a check for the end of header (EOH) is made in block 510. If this is the end of the header, processing is completed. If not, then the next page is read in block 512 and control returns to block 500. In addition, a check is made in block 514 to determine whether the first page has been recycled. If so, the recently read page forms part of the pool of free pages 516. This processing is repeated until the EOH is reached.

The payload processing has the same operations performed in parallel, as indicated with blocks 520-536. Block 530 checks for an end of packet EOP, otherwise the processing is the same as in the case of the header.

Another enhancement is the elimination of reference count storage accesses for unicast packets. In the baseline implementation as well as in the scheme presented in connection with FIG. 5, unicast packets still need to access the RefCnt Storage. However, there is no need for a unicast packet to access any reference count since by the definition of unicast in this disclosure the pages are not shared by any other packet.

Figure 6A:
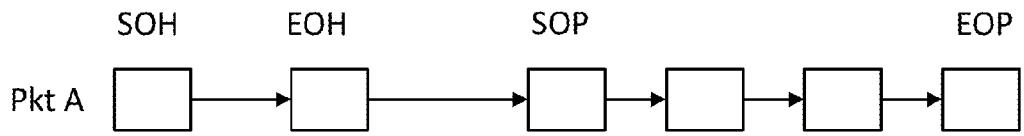
FIGS. 6A-6F show examples of page link lists with only the first header and first payload page (if any) of non-unicast packets having reference count information.
Figure 6B:
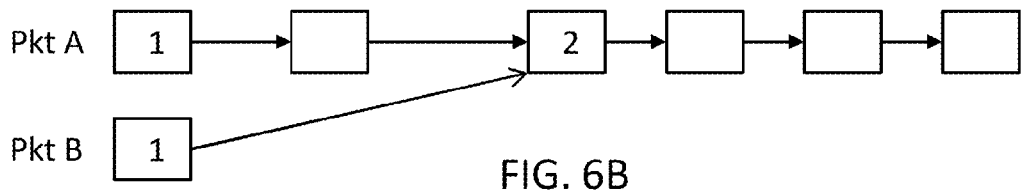
Figure 6C:
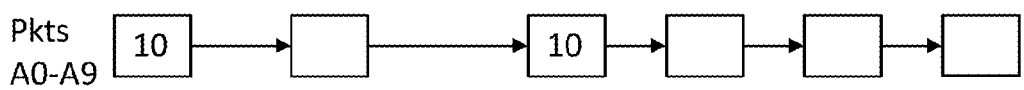
Figure 6D:
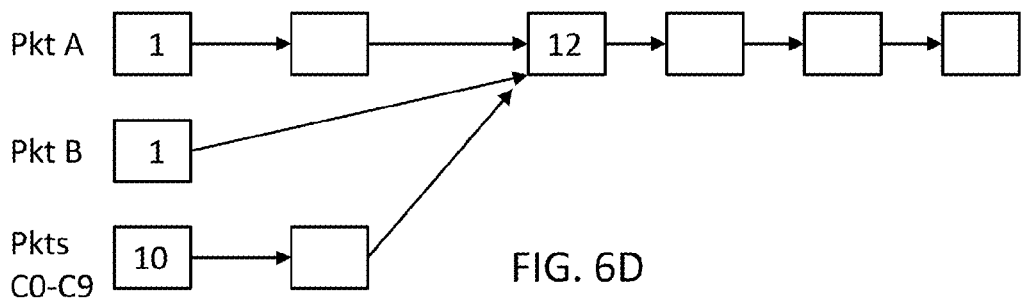
Figure 6E:
Figure 6F:
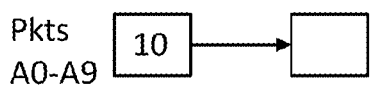

Therefore, an additional optimization of the RefCnt Storage access scheme is for unicast packets to completely avoid accessing the resource. In this case, FIG. 6A and FIG. 6E do not need to access the RefCnt Storage. FIGS. 6B, 6C and 6F correspond to FIGS. 4B, 4C and 4F.

The unicast/non-unicast attribute may be generated in the Control block. Therefore, the Control block needs to include in the descriptor a bit (ref cnt vld) to indicate such attribute to the TDMA, which in turn will send the same bit to the BM when the packet pages need to be reclaimed.

Figure 7:
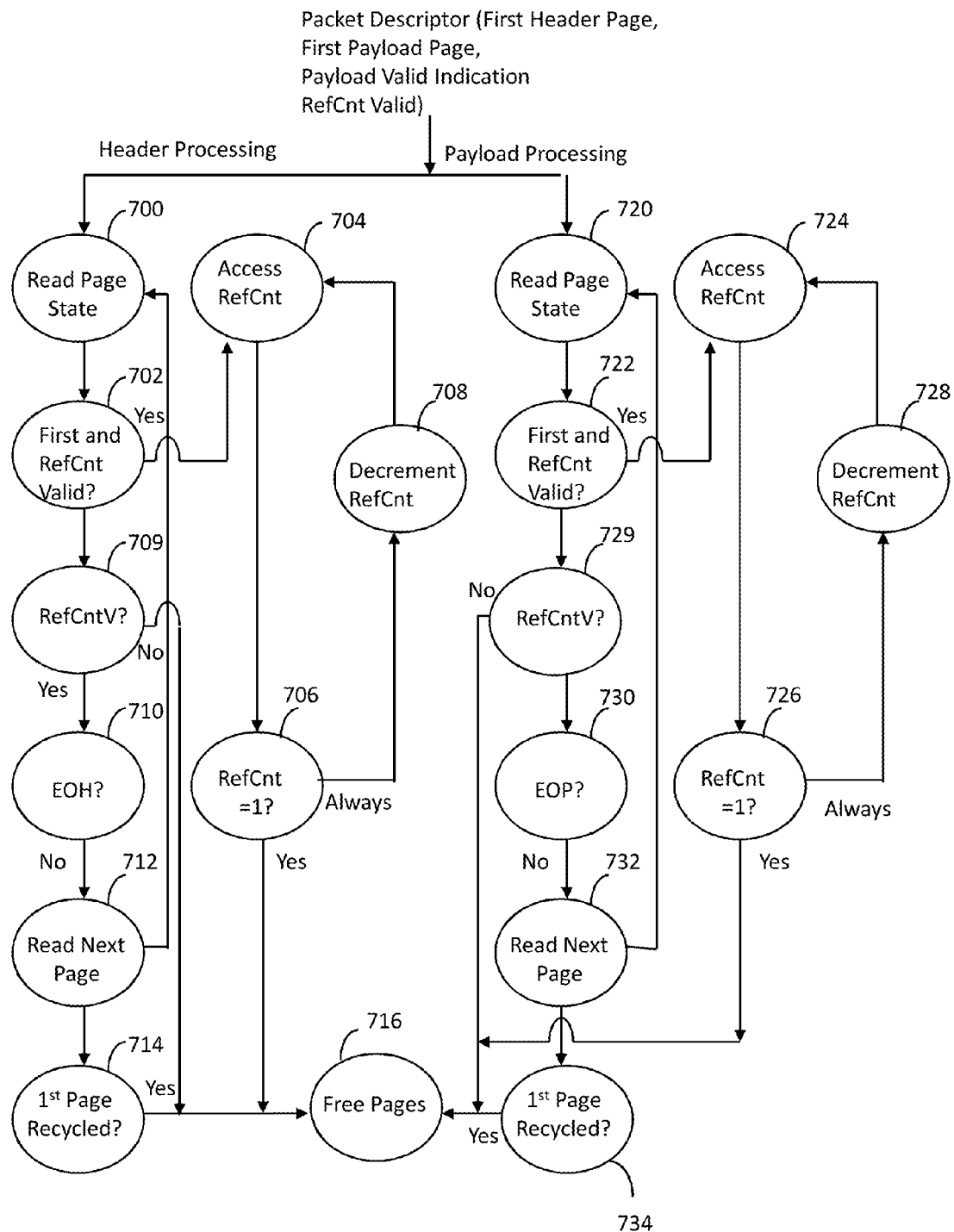
FIG. 7 shows processing utilizing a reference count valid signal utilized in accordance with an embodiment of the invention.

Now the access to the RefCnt Storage is more restrictive, as shown in FIG. 7. FIG. 7 corresponds to FIG. 5, but has additional checks for the reference count valid bit (ref cnt vld). Page state is read in block 700, just as in the case of block 500 of FIG. 5. A new check is then made for a first page and a reference count valid bit in block 702. If this condition is satisfied, the control moves to blocks 704-708, which operate as blocks 504-508 of FIG. 5. Block 709 checks the reference count valid bit. If the reference count is not valid, then the page may be assigned to the free page pool 716. Processing of blocks 712-714 corresponds to processing of blocks 512-514 of FIG. 5. The payload processing of blocks 720-734 mirrors the header processing, except that an end of package (EOP) check is performed in block 730, instead of an end of header (EOH) check.

Figure 8:
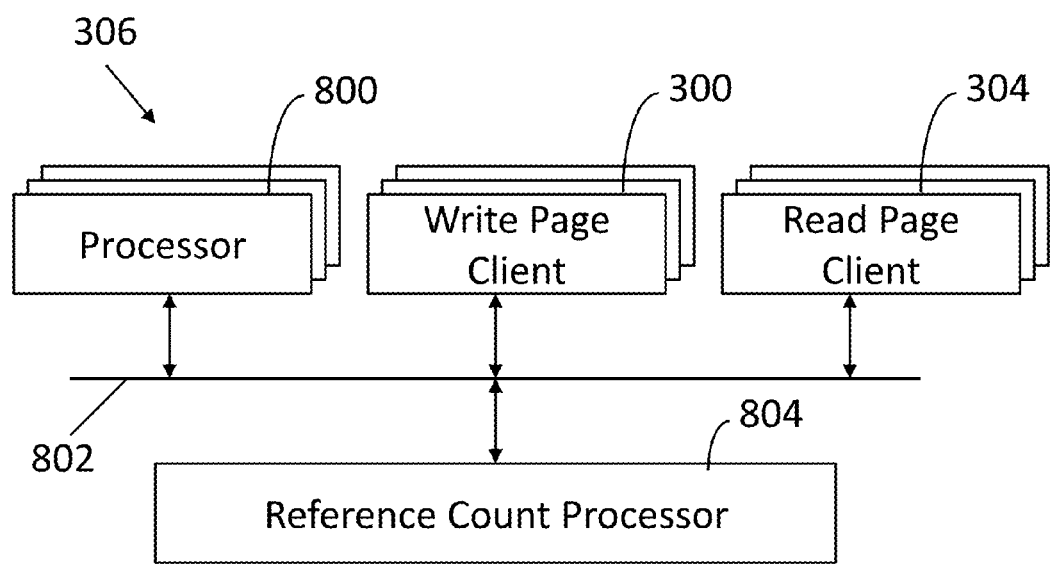
FIG. 8 illustrates a memory manager configured in accordance with an embodiment of the invention.

FIG. 8 illustrates a packet memory manager 306 configured in accordance with an embodiment of the invention. The packet memory manager 306 includes one or more processors 800 connected to one or more write page clients 300 and read page clients 304 via a bus 802. The write page clients 300 may be individual receive direct memory access blocks associated with individual input ports. The read page clients 304 may be individual transmit direct memory access blocks associated with individual output ports. A reference count processor 804 is also connected to the bus 802. The reference count processor 804 may be implemented in silicon, firmware or source code. The reference count processor 804 implements the operations discussed above.

Thus, an optimization is presented that frees unicast packets from accessing the page reference storage and thus leaves all the bandwidth for the multicast/broadcast packets. Moreover, for multicast/broadcast packets, at most two pages for each packet need to be accessed for this purpose instead of all pages. Due to the lower number of accesses, this storage resource can be implemented with fewer ports and presents a lower power consumption profile.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A packet processor, comprising:
a packet memory manager configured to
receive a single header reference count and a single payload reference count for a packet with a header and a payload; and
perform in parallel a page link list walk for the header under the control of the single header reference count and a page link list walk for the payload under the control of the single payload reference count, wherein each page link list walk traverses a linked list of all pages that a particular packet uses in packet memory.

2. The packet processor of claim 1 wherein the single header reference count is associated with a first header page for the packet.

3. The packet processor of claim 1 wherein the single payload reference count is associated with a first payload page for the packet.

4. The packet processor of claim 1 wherein the packet memory manager is configured to process a payload valid indication.

5. The packet processor of claim 1 wherein the packet memory manager is configured to free a page when the single payload reference count is one.

6. The packet processor of claim 1 wherein the packet memory manager is configured to free individual pages after a first reference page is recycled.

7. The packet processor of claim 1 further comprising:
    a packet memory manager configured to
        receive an indicator of reference count invalidity; and
        free a header page and a payload page in response to the indication of reference count invalidity without accessing a reference count.

\* \* \* \* \*